United States Patent Office 3,281,297
Patented Oct. 25, 1966

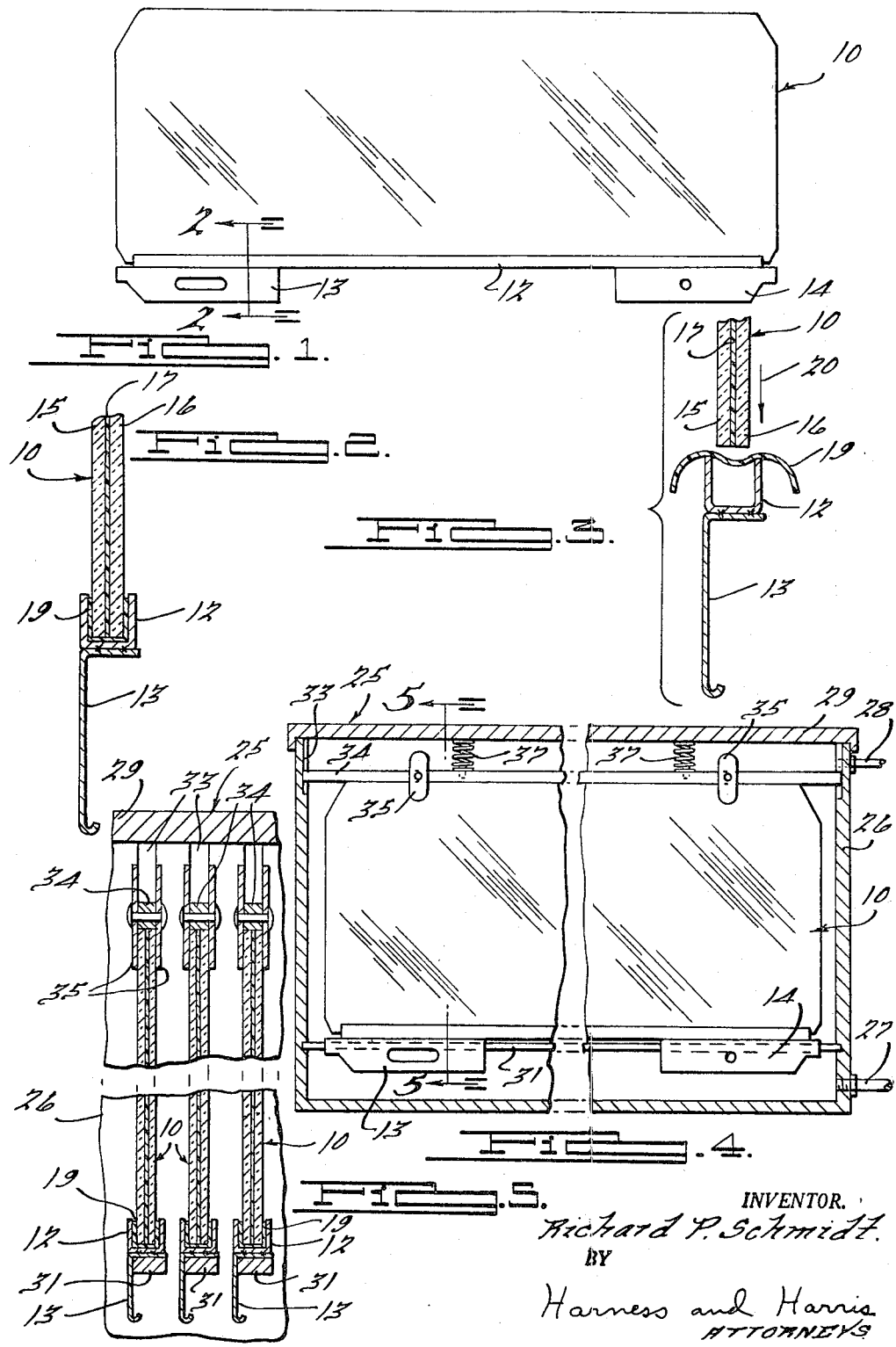

3,281,297
METHOD OF MAKING A LAMINATED
GLASS ASSEMBLY
Richard P. Schmidt, 397 Palos Road, Glencoe, Ill.
Filed June 23, 1965, Ser. No. 471,498
1 Claim. (Cl. 156—106)

This invention is a continuation in part of Richard P. Schmidt application, Serial No. 92,647, now abandoned and relates to the bonded connection between a laminated glass panel and a peripheral supporting channel member for the glass panel. This invention includes the method of manufacture to effect this connection whereby the bonded connection of the supporting channel to the panel is simultaneously accomplished during the heat treatment of the laminate layers to accomplish the lamination thereof.

The manner of effecting a positive sealed connection between a glass panel and a peripheral channel support member has presented a number of problems relative to the positiveness of the connection as well as the seal between the panel glass and the supporting channel member. This problem has been given special consideration by the automotive industry where every effort is being made to improve the quality of the vehicle components and at the same time to reduce the cost thereof. This invention discloses a means whereby an improved connection is obtained between the panel and the supporting channel and wherein the cost is materially reduced because of the fact that scrap material resulting from the glass laminating process can be utilized to effect the bonded connection between the panel glass and its supporting channel members. This improved connection not only has improved bonding strength but at the same time has proven to be a weather tight connection that prevents the introduction of moisture to the interior of the channel member where it might cause deterioration of the channel through rust or the like.

In order to point out the economic advantage of this invention, a brief description must be given relative to the laminating of glass such as that used for automobile windshield panels or other safety glass panels. In order to produce laminated glass a pair of glass panels have inserted between them an interlayer of plastic material that is cured to provide a transparent adhesive between the adjacent faces of the spaced glass panels. Because this plastic interlayer material is usually provided in sheets that are somewhat larger than the glass panels between which it is inserted, it is necessary to trim the overhanging edges of the interlayer after the assembly has been made. The scrap material that is trimmed from around the laminated glass assembly has normally been disposed of as a complete loss. As a result of experimentation it has now been found that this plastic trim scrap can be utilized as the vinyl adhesive to bond the peripheral edges of a glass panel to the encircling peripheral channel member utilized to support the glass panel. This invention relates to the article formed by the utilization of the interlayer plastic as a glass-to-channel bonding material and to the method used to form this article.

The various advantages obtained by applying this invention will be apparent from a consideration of the below listed figures of the drawing and the subsequent description:

FIGURE 1 is a side elevational view of a laminated glass panel having a channel-type supporting frame along its lower edge;

FIGURE 2 is an enlarged fragmentary sectional elevational view taken along the line 2—2 of FIGURE 1;

FIGURE 3 is an exploded fragmentary sectional elevational view similar to FIGURE 2 showing the method of assembly of the glass, channel, and vinyl adhesive utilized in carrying out this invention;

FIGURE 4 is a sectional elevational view of an autoclave unit utilized to carry out the method of manufacture involving this invention; and FIGURE 5 is an enlarged fragmentary sectional elevational view taken along the lines 5—5 of FIGURE 4.

FIGURE 1 of the drawings shows a window glass unit 10, such as that used in the door of a motor vehicle. This panel 10 is supported along its lower edge by channel strip 12 that has window actuating brackets 13 and 14 depending from the lower side of the channel 12. As will be noted from FIGURES 2 and 3, the laminated glass panel 10 is composed of a pair of glass sheets 15 and 16 that have a plastic adhesive sheet 17 inserted between and connecting the adjacent faces of the sheets 15 and 16. The plastic interlayer 17 originally was of such size as to extend outwardly from the edges of the spaced glass panels 15 and 16 but the overhanging portions of the plastic interlayer 17 were trimmed from the glass panel assembly and this trim material provides the narrow strip of bonding material 19 that is used to effect the bonded connection between the peripheral portions of the panel 10 and the interior walls of the channel member 12.

After the panel assembly elements 15–17 have been assembled as a sandwich and the interlayer 17 trimmed to size, but prior to laminating the elements into a completed unit, then the panel 10 is placed above the channel member 12 as clearly shown in FIGURE 3. A narrow strip of plastic interlayer material 19 is then supported across the open upper end of the channel member 12 after which the glass panel 10 is pressed downwardly as indicated by the arrow 20 so as to press the plastic strip 19 into the channel member 12 such that the resultant assembly will be that shown in FIGURE 2. After the panel member 10 has been assembled in the channel member 12 with the plastic interlayer strip 19 insulating the peripheral edge of the glass panel 10 from the interior walls of the channel member 12 then the assembly is placed in a suitable heating means, such as an autoclave, so as to simultaneously laminate the panels 15 and 16 to the interlayer 17 and convert the uncured U-shaped strip of plastic material 19 to an effective bonding material that positively connects the glass panel 10 to the interior walls of the channel member 12. Thus the single autoclaving operation accomplishes two functions and provides an improved economical manufacturing process.

FIGURE 4 represents diagrammatically one form of autoclave unit 25 that is currently in use in automobile glass plants and that can be readily used to simultaneously laminate the layers 15, 16 and 17 of glass panel 10 and to also effect the bond between the edge portions of glass panel 10 and the supporting channel 12. Autoclave 25 comprises a cup-like tank 26 having a heat supply conduit 27 and a vent pipe 28. Suitable valving for control of these conduits 27, 28 is not shown. The drum tank 26 is adapted to have its open end closed by a suitable cover 29. Supported within the tank 26 are a plurality of spaced rack bars 31 that are adapted to seat the lower edge portions of the glass supporting channel member 12. The upper portions of the tank 26 include a plurality of spaced slots 33 that are adapted to slidably receive the opposite ends of the retainer bars 34. The retainer bars 34 each carry one or more pivoted latching fingers 35 that are adapted to receive therebetween the upper edge portions of the associated glass panels 10. Suitable resilient means, such as springs 37 may be carried by the retainer bars 34 so that when the drum cover 29 is applied the springs 37 will be compressed and the glass panels 10 will be firmly anchored within the autoclave unit 25. With the glass elements 10 mounted within the autoclave unit 25, as shown in FIGURE 4, then when steam or some hot fluid or liquid is supplied to the interior of the autoclave 25 through the supply conduit 27 the temperature within the autoclave 25 can be raised to such a degree that the uncured plastic bonding strip 19 will be converted into a plastic bonding material that firmly cements the glass panel 10 to the interior walls of the support channel 12. It has been found that with vinyl butyral material used as the bonding strip 19 that an effective bond to the glass panel 10 and the supporting channel member 12 can be obtained by raising the temperature within the autoclave 25 to 300° F. for a period of approximately twenty minutes.

It is thought to be obvious from the description of this glass-to-channel connection and its method of manufacture, that this invention provides an improved means for firmly anchoring a glass panel 10 to a supporting channel member 12 wherein the bonding material not only forms a positive connection between the glass and channel member, but at the same time seals the channel against the entrance of moisture of any type that might have a deteriorating effect on the interior walls of the channel member 12. Also, the bonded strip 19 is of such a consistency that it cushions the glass in the supporting frame 12 and insulates the glass from any noise that might be transmitted to it through the metallic channel member 12. This invention eliminates the need for boring bolt holes or fastening impressions in the glass panel 10 and also eliminates the need for expensive cushioning and/or sealing strips that have heretofore been used to interconnect the peripheral edge portions of a panel glass to its supporting frame member.

While the invention has been successfully demonstrated using a plasticized polyvinyl butyral as the glass laminating adhesive and as the glass-to-channel bonding material, still, applicant does not consider his invention as restricted to that material alone. It is considered to be within the scope of this invention to use any plasticized or unplasticized thermosetting material as the glass-to-channel bonding material and particularly the use of this type of material for the laminating interlayer and also the panel peripheral glass-to-channel bonding material. In actual tests that have been run to demonstrate this invention plasticized polyvinyl butyral having approximately 20 to 45 parts of plasticizer to each 100 parts of resin have produced excellent glass-to-channel bonds while also providing suitable interlayer material for laminating processess. One plasticizer that has been used successfully is triethylene glycol dehexoate.

It is also to be understood that while autoclaving, which may be either dry as with hot air or wet as with hot oil, is shown as a preferred heating means for effecting the bonding operation between the resin 19 and the interconnected materials 10, 12, still, any other heating means such as dielectric, radiant type, or the like can also be used to activate the thermosetting bonding material 19.

Although it is advantageous to use a continuous length of the thermosetting resin strip 19 to envelope the edge of the glass panel 10, still, it is possible to use spaced strip or patches of the thermosetting resin 19 to obtain the bonded connection.

I claim:

The method of making a laminated glass assembly that has a connected U-shaped metallic edging channel enclosing an edge portion of said assembly comprising assembling a pair of glass panels in face-to-face relationship with a sheet of thermosetting plastic interlayer material sandwiched therebetween, positioning an edge portion of the glass and interlayer sandwich assembly above and in aligned relation to the mouth of a U-shaped edging channel that has a strip of thermosetting plastic material bridging said edging channel mouth, said strip of thermosetting plastic material having substantially the same bonding characteristics and properties as said thermosetting plastic interlayer material, wedgingly forcing the said edge portion of the panel sandwich assembly into the U-shaped edging channel so as to trap said strip of thermosetting plastic material in said edging channel between said panel assembly edge portions and the inner surfaces of said U-shaped edging channel, and finally applying heat to said assembled panel assembly and edging channel whereby the glass panel elements are bonded together by said interlayer material and simultaneously the edge portion of the glass sandwich assembly is directly bonded to the inner surfaces of said U-shaped edging channel.

References Cited by the Examiner

UNITED STATES PATENTS

| 2,409,808 | 10/1946 | Sowle | 52—309 |
| 3,008,197 | 11/1961 | Trzyna et al. | 52—309 |

FRANK L. ABBOTT, *Primary Examiner.*

R. S. VERMUT, *Assistant Examiner.*